(12) United States Patent
Henry et al.

(10) Patent No.: US 9,164,362 B2
(45) Date of Patent: Oct. 20, 2015

(54) SWIVEL TETHER

(71) Applicant: Black Rapid, Inc., Seattle, WA (US)

(72) Inventors: Ronald Dean Henry, Seattle, WA (US);
Nancy S. Riemer, Seattle, WA (US);
Robert Gerald Carrasca, Seattle, WA (US); Tyler C. Swain, Seattle, WA (US)

(73) Assignee: BLACK RAPID, INC., Seattle, WA (US)

( * ) Notice: Subject to any disclaimer, the term of this patent is extended or adjusted under 35 U.S.C. 154(b) by 0 days.

(21) Appl. No.: 13/967,955

(22) Filed: Aug. 15, 2013

(65) Prior Publication Data

US 2014/0050468 A1 Feb. 20, 2014

Related U.S. Application Data

(60) Provisional application No. 61/683,591, filed on Aug. 15, 2012.

(51) Int. Cl.
| | |
|---|---|
| *G03B 17/56* | (2006.01) |
| *A45C 13/30* | (2006.01) |
| *A45F 5/00* | (2006.01) |
| *A44B 11/26* | (2006.01) |

(52) U.S. Cl.
CPC .............. *G03B 17/561* (2013.01); *A45C 13/30* (2013.01); *A45F 5/00* (2013.01); *A44B 11/266* (2013.01); *A45C 2013/306* (2013.01); *A45F 2005/006* (2013.01); *A45F 2200/0533* (2013.01)

(58) Field of Classification Search
USPC ............ 396/423, 419, 427; 24/115 F, 115 R, 24/265 H, 625; 403/220
See application file for complete search history.

(56) References Cited

U.S. PATENT DOCUMENTS

| 4,328,917 A | 5/1982 | Reeberg |
| 5,709,014 A | 1/1998 | Takahashi |
| 5,738,256 A | 4/1998 | Goff et al. |
| 6,591,461 B2 * | 7/2003 | Salentine et al. ............ 24/115 F |
| 2004/0226150 A1 * | 11/2004 | Beletsky ......................... 24/625 |
| 2007/0278265 A1 | 12/2007 | Contente |
| 2012/0014686 A1 | 1/2012 | Kope et al. |

* cited by examiner

*Primary Examiner* — Rochelle-Ann J Blackman
(74) *Attorney, Agent, or Firm* — Davis Wright Tremaine LLP; George C. Rondeau, Jr.

(57) ABSTRACT

A swivel tether for attaching a camera via a cord to an object, the swivel tether including a side release buckle system having a ball joint connection that allows for 360 degree swivel functionality. This permits the camera to rotate freely without adding tension or twisting of the cord attached thereto and without causing a threaded connection between an end of the cord and the camera to become unthreaded due to rotation of the camera. The ball joint connection may be configured in the plug connection component of the side release buckle system. The side release buckle system also includes a slide lock switch operative to lock plug and socket portions of the buckle system together to prevent unintentional release of the buckle system when fastened.

12 Claims, 10 Drawing Sheets

SWIVEL TETHER

CROSS REFERENCE TO RELATED APPLICATION

This application claims the benefit of U.S. Provisional Application No. 61/683,591, filed Aug. 15, 2012, the contents of which are incorporated herein by reference.

BACKGROUND

Conventional tethers for cameras may be used to selectively couple a camera or similar device to other objects, including shoulder straps, camera bags, wrist straps, belt straps, etc. This allows the camera to be secured to other objects during transport or use of the camera, which facilitates ease of use and may act as a safety measure to prevent the camera from falling if it slips from a user's grip. Often, the end of the tether near the camera is coupled to a loop or ring that is fixedly or selectively coupled to the camera. In some cases, the loop or ring includes a threaded shaft configured to threadably engage with a threaded socket of the camera, such as a tripod socket on the camera body or lens.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present invention are directed to providing a swivel tether for attaching a camera to an object via a strap or cord. In some embodiments, the swivel tether includes a side release buckle system or coupler having a ball-knuckle connection (or ball joint) that allows for 360 degree swivel functionality. This permits the camera attached to the swivel tether to rotate freely without adding tension or twisting of the cord attached thereto and without causing a threaded connection between an end of the cord and the camera to become unthreaded due to rotation of the camera. In some embodiments, the ball joint connection may be captured in a plug connection component of the side release buckle system. In some embodiments, the side release buckle system or coupler also includes a slide lock switch operative to lock the plug and socket connection components of the buckle system together to prevent unintentional release of the buckle when the buckle is fastened.

Figure 1:
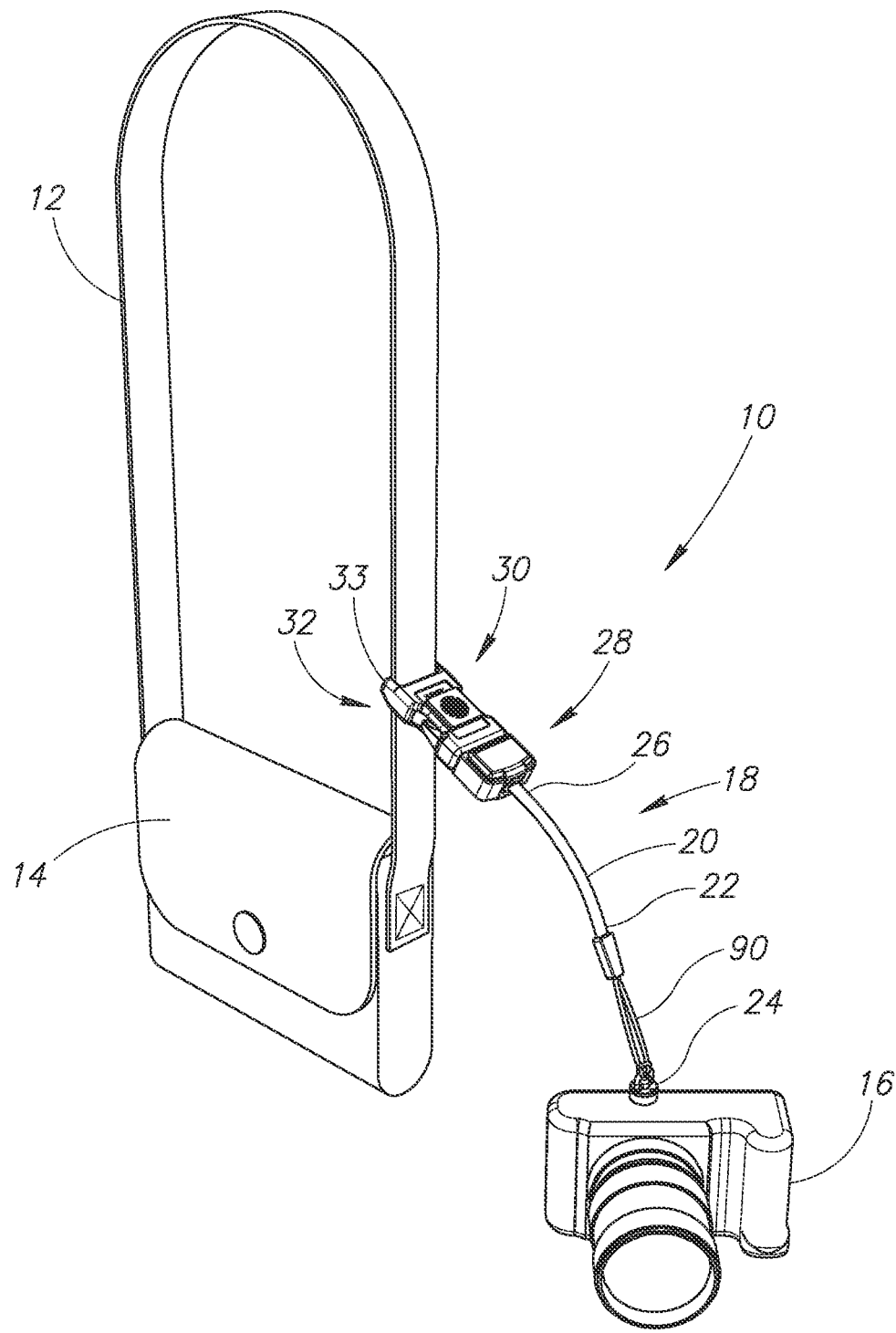
FIG. 1 illustrates a first embodiment of a swivel tether when coupled to a shoulder strap of a camera carrying apparatus.
Figure 5:
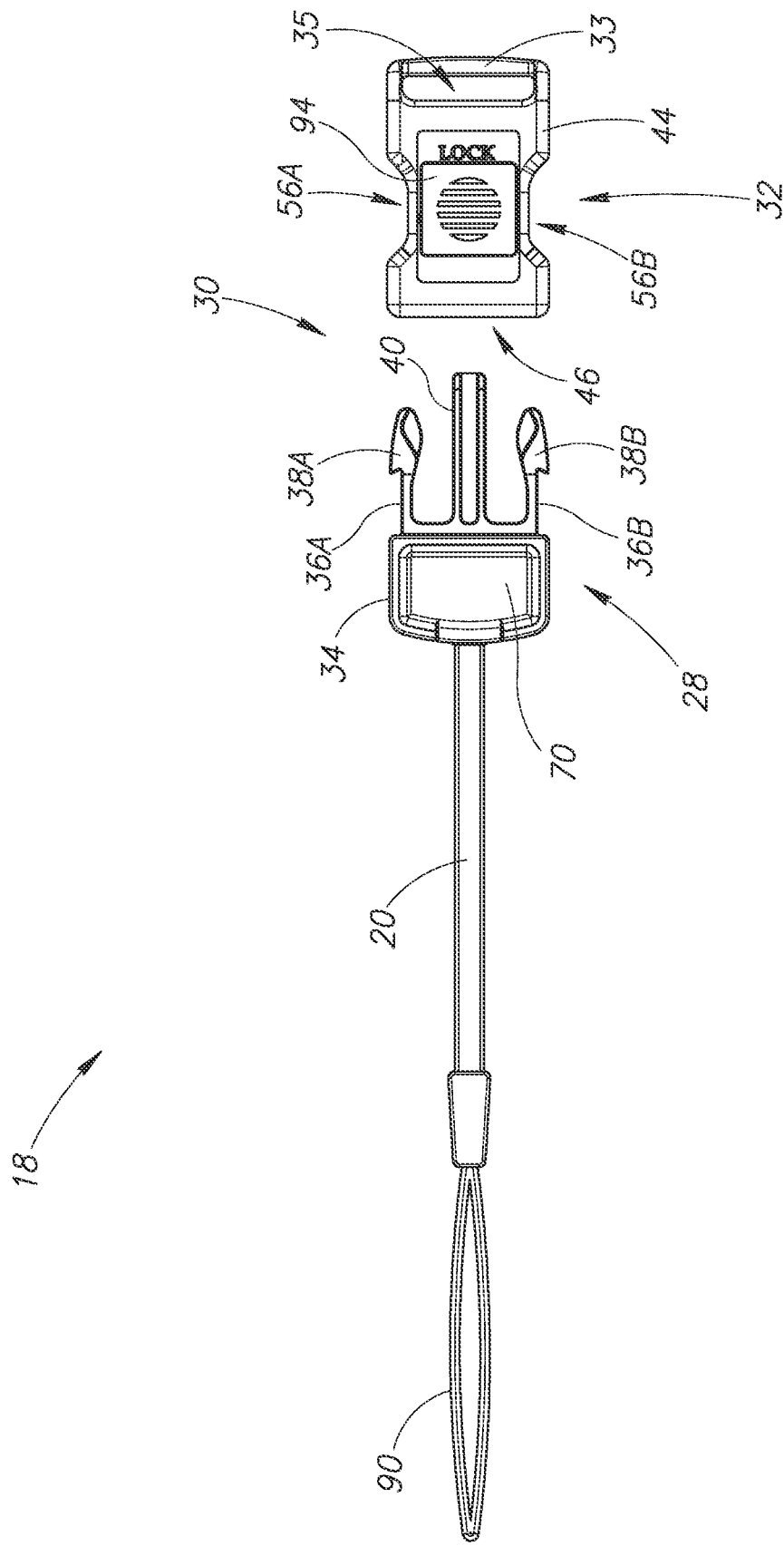
FIG. 5 illustrates a top view of the swivel tether when a plug connection component is disconnected from a socket connection component.

Referring to FIG. 1, a camera carrying apparatus 10 is illustrated that comprises a shoulder strap 12 and an enclosure 14 sized to receive a camera 16 or similar device within its interior area while not in operation. The camera 16 interfaces with the apparatus 10 by using a swivel tether 18 comprising a camera attachment cord or strap 20 and a buckle system 30. The camera attachment strap may be made from any suitable material, such as nylon webbing, etc. A first end portion 22 of the camera attachment strap 20 is attached to the camera 16 by using an engagement point located on the camera 16, or instead, a camera tripod socket. When using the tripod socket of the camera 16, the first end portion 22 of the camera attachment strap 20 is attached to a fastener 24 which is threadably or otherwise removably engaged with the camera's tripod socket or another socket or receiver. A second end portion 26 of the camera attachment strap 20 is attached to a first or plug connection component 28 of the buckle system 30. The buckle system 30 also has a second or socket connection component 32 selectively couplable to the plug connection component 28 and having a shoulder strap receiving portion 33 defining an aperture 35 (see FIG. 5) therein sized and shaped to allow sliding passage of the shoulder strap 12 therethrough for sliding the strap receiving portion 33 along the shoulder strap. When the buckle system 30 is coupled so that the plug connection component 28 and the socket connection component 32 are connected together, the camera attachment strap 20 and camera 16 become slidably engaged with the shoulder strap 12. To remove the camera 16 and camera attachment strap 20 from the shoulder strap 12, a user may disconnect the plug connection component 28 and the socket connection component 32 of the buckle system 30. The user may then attach the camera attachment strap 20 and camera 16 to other objects, such as a wrist strap, belt strap, etc. Alternatively, the socket connection component 32 may be attached to the second end portion 26 of the camera attachment strap 20 and the plug connection component 28 includes the shoulder strap receiving portion 33.

Figure 2:
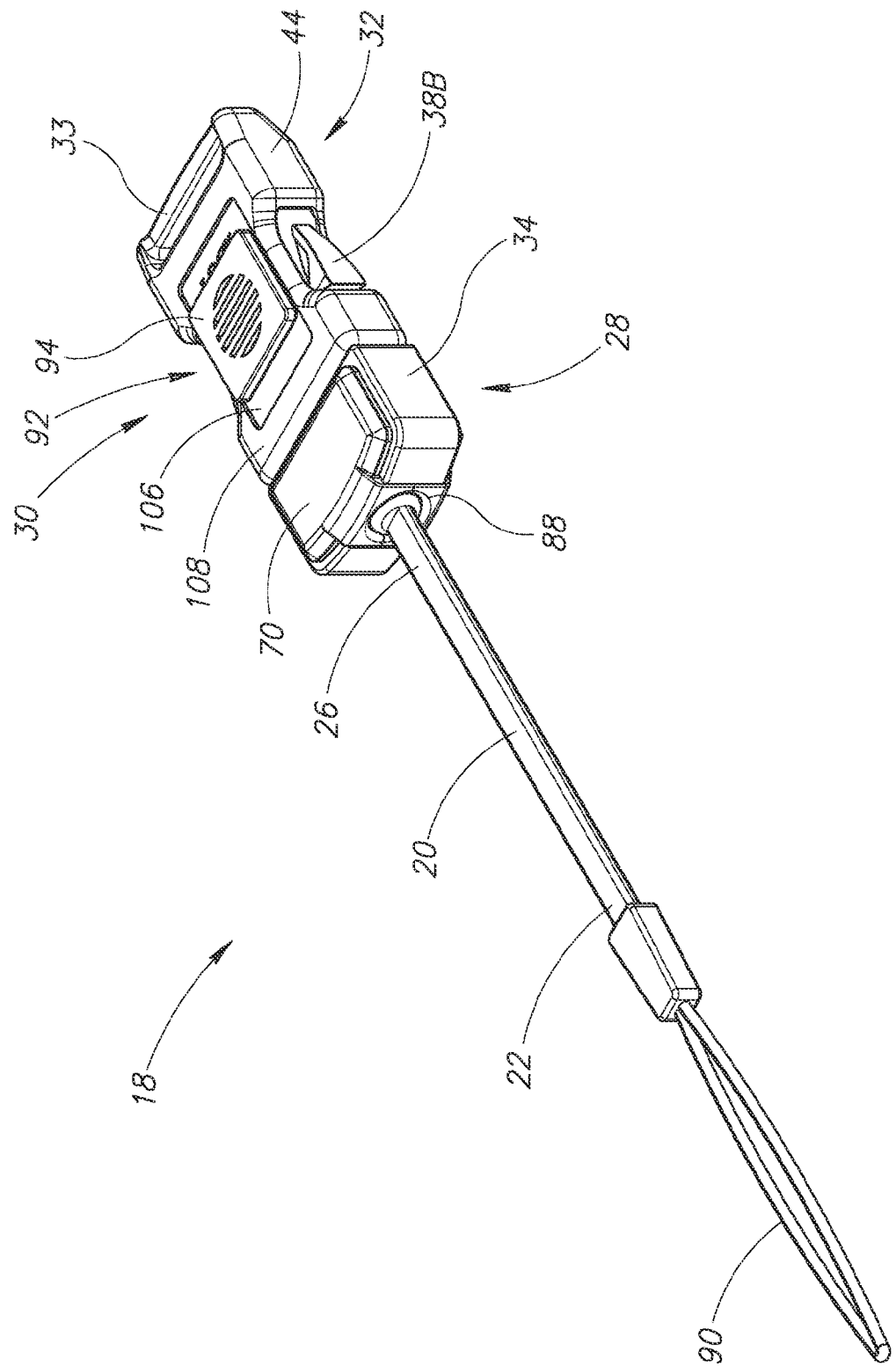
FIG. 2 illustrates a top perspective view of the swivel tether of FIG. 1.
Figure 3:
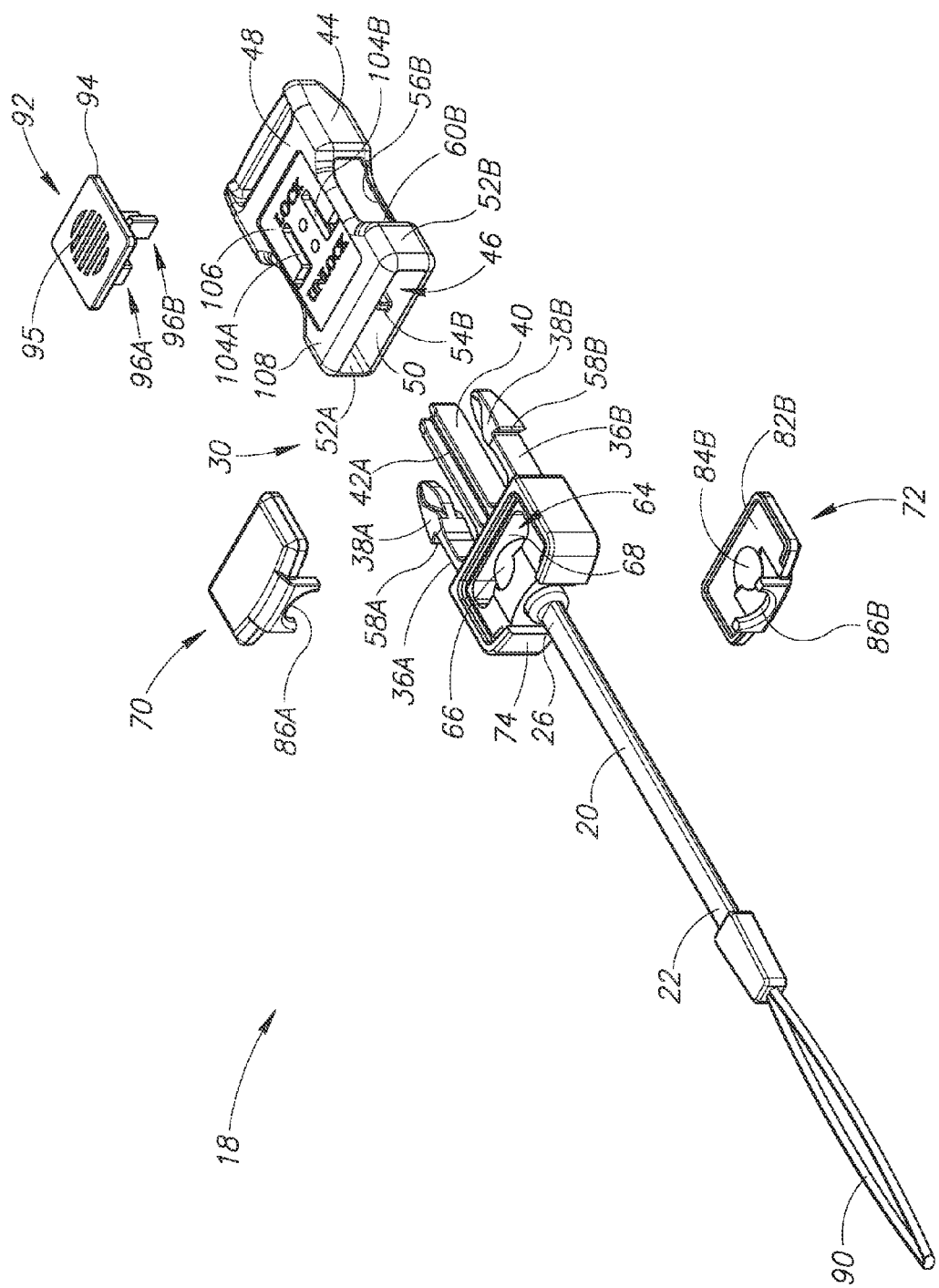
FIG. 3 illustrates an exploded top perspective view of the swivel tether.
Figure 4:
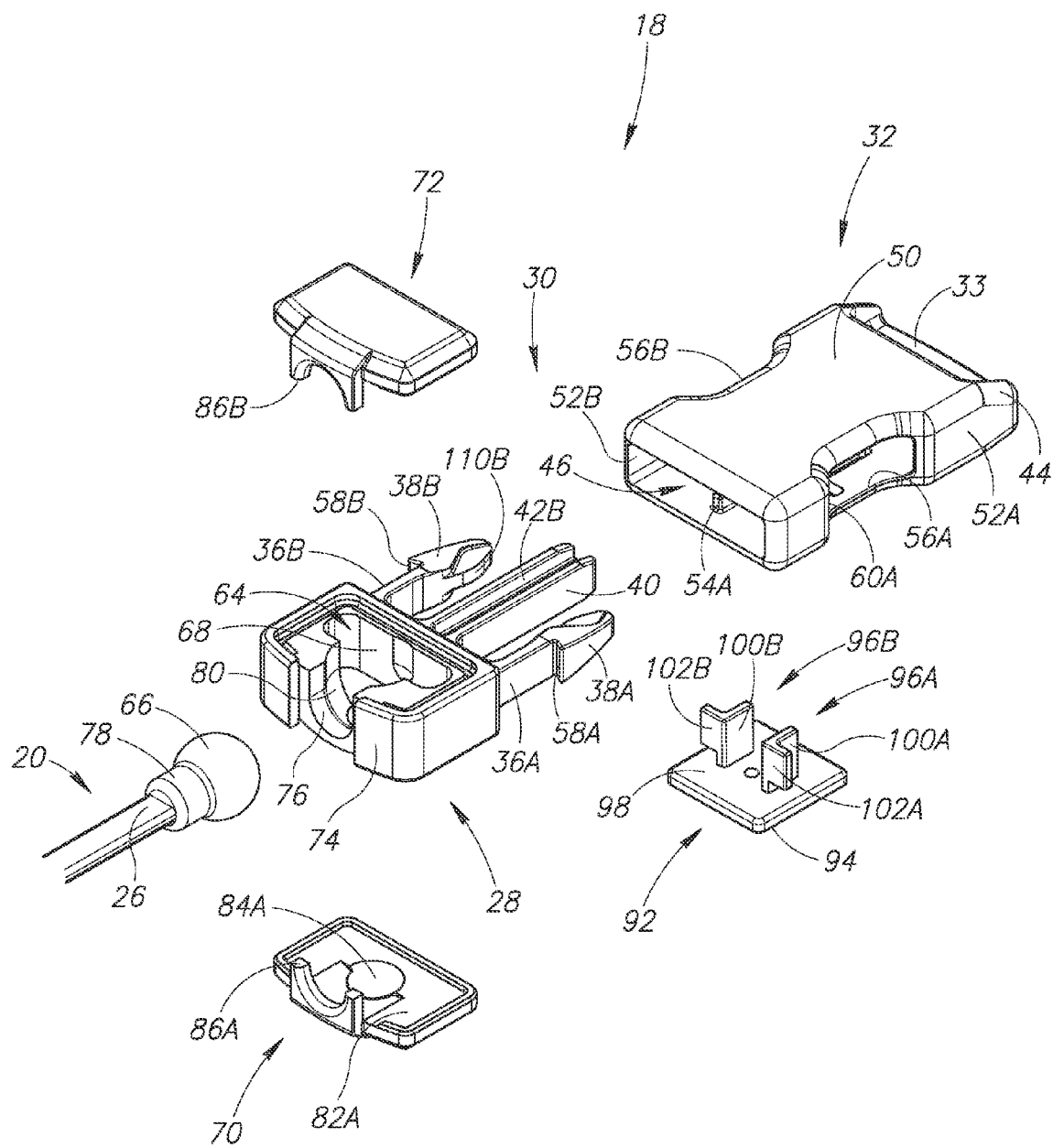
FIG. 4 illustrates an exploded bottom perspective view of the swivel tether.

Referring now to FIGS. 2-5, there is shown the swivel tether 18 of FIG. 1. The buckle system 30 of the swivel tether 18 includes the plug connection component 28 formed from a base member 34, which supports flexible spring arms 36A and 36B (see FIG. 3) extending therefrom that comprise locking tabs 38A and 38B, respectively, near their ends. A guide element or arm 40 is disposed between the spring arms 36A and 36B and includes an upward facing guide slot 42A (FIG. 3) and a downward facing guide slot 42B (FIG. 4). Arms 36A, 36B, and 40 releasably guide and connect the plug connection component 28 to the socket connection component 32.

The socket connection component 32 includes a hollow body 44 having a connection or main opening 46 defined by a top wall 48 opposite a bottom wall 50 and opposing side walls 52A and 52B extending between the top wall and the bottom wall. The top wall 48 and bottom wall 50 are equipped with a top guide rail 54A (FIG. 4) and a bottom guide rail 54B (FIG. 3), respectively, disposed within the hollow body 44. The top guide rail 54A and the bottom guide rail 54B are configured to slidably engage the upward facing guide slot 42A and the downward facing guide slot 42B, respectively, of the guide arm 40 when the arms 36A, 36B, and 40 are inserted into the main opening 46. The main opening 46 of the socket connection component 32 faces the plug connection component 28 when the user is coupling the two together.

The opposite sidewalls 52A and 52B of the hollow body 44 have locking opening or slots 56A and 56B, respectively, disposed therein. The locking slots 56A and 56B removably receive the locking tabs 38A and 38B, respectively, upon full insertion of the arms 36A, 36B, and 40 of the plug connection component 28 into the main opening 46 of the socket connection component 32 for selectively removably locking the plug connection component and the socket connection component together. Specifically, when the arms 36A, 36B, and 40 are inserted into the main opening 46, the spring arms 36A and 36B flex inward slightly and slide along the sidewalls 52A and 52B, respectively. The locking tabs 38A and 38B expand outward and snap into the locking slots 56A and 56B, respectively, as the buckle system 30 is closed, with shoulders 58A and 58B of the locking tabs 38A and 38B engaging edges 60A and 60B, respectively, of the locking slots 56A and 56B. To release the plug connection component 28 from the socket connection component 32, the user presses the locking tabs 38A and 38B protruding from the locking slots 56A and 56B, together to thereby move the spring arms 36A and 36B together to disengage the locking tabs 38A and 38B from the locking slots 56A and 56B and allow the plug connection component to be withdrawn from the socket connection component and separated.

The base member 34 of the plug connection component 28 includes a hollow cavity or socket 64 configured for receiving a swivel connection or ball member 66 ""attached to the second end portion 26 of the camera attachment strap 20. The socket 64 is defined on the sides by an inward facing sidewall 68 of the base member 34, on the top by a top base member portion 70, and on the bottom by a bottom base member portion 72. The top base member portion 70 and the bottom base member portion 72 may each be fixedly secured to the base member 34 during assembly of the buckle system 30 using any suitable process such as, but not limited to, sonic welding.

As shown best in FIG. 4, an end 74 of the base member 34 opposite the arms 36A, 36B and 40 includes a U-shaped seat 76 for receiving a neck portion 78 of the ball member 66. Inward from the seat 76 is a bearing surface 80 shaped to substantially match the curvature of the ball portion of the ball member 66. As shown in FIGS. 3 and 4, inner surfaces 82A and 82B of the top base member portion 70 and the bottom base member portion 72, respectively, also include bearing surface portions 84A and 84B, respectively, shaped to substantially match the curvature of the ball portion of the ball member 66.

During assembly of the buckle system 30, the ball member 66 may be positioned in the socket 64 as shown in FIG. 3. Then, the top base member portion 70 and the bottom base member portion 72 may be attached to the base member 34, permanently as discussed above or removably if desired. The top base member portion 70 and the bottom base member portion 72 include arc-shaped ball retaining ring portions 86A and 86B, respectively, that together define a ball retaining ring 88 for receiving the neck portion 78 of the ball member 66 once the buckle system 30 is assembled (see FIG. 2). The ball retaining ring 88 has a diameter slightly larger than the neck portion 78 but smaller than the ball portion of the ball member 66 so that the ball cannot be removed from the socket 64 after assembly once the top base member portion 70 and the bottom base member portion 72 are attached to the base member 34. The bearing surface 80 of the base member 34 and the bearing surface portions 84A and 84B of the top and bottom base member portions 70 and 72, respectively, together form a "bearing shell" in which the ball portion of the ball member 66 may freely rotate. Preferably, the plug connection component 28 is rotatable 360 degrees about the ball member 66 and hence swivels 360 degrees relative to the camera attachment strap 20.

As shown for example in FIG. 2, the first end portion 22 of the camera attachment strap 20 includes a flexible loop 90. The loop 90 may be coupled to a camera connection component such as a loop or ring that is fixedly or removably coupled to a camera such as the fastener 24 shown in FIG. 1.

In the embodiment shown, the ball member 66 is formed as part of and located at an end of the camera attachment strap 20 while the socket 64 is formed as part of the base member 34. In another embodiments (not shown), the ball member 66 is formed as part of the base member 34 while the socket 64 is formed as part of and located at an end of the camera attachment strap 20. In other embodiments, the joint formed by the ball member 66 and socket 64 is associated with the socket connection component 32 rather than the plug connection component 28. Additionally, although the terms "top" and "bottom" are used herein for explanatory purposes, in some embodiments what is referred to as the top of the plug connection component 28 may be aligned with what is referred to as the bottom of the socket connection component 32 when the two components are connected together.

As shown in FIGS. 2-4, in some embodiments the buckle system 30 also includes a slide lock switch 92 operative to lock the plug connection component 28 to the socket connection component 32 when connected together. This feature advantageously provides additional security for the buckle system 30 by preventing the connection components 28 and 32 from becoming unintentionally disconnected from each other during use. The slide lock switch 92 includes a slide plate 94 having a grip surface 95 on the top thereof for engagement by a finger of a user. As may best be seen in FIG. 4, the slide lock switch 92 also includes two lock tabs 96A and 96B extending downward from a bottom surface 98 of the slide plate 94. The lock tabs 96A and 96B include spaced apart guide portions 100A and 100B, respectively, and laterally outwardly extending locking portions 102A and 102B.

Figure 6:
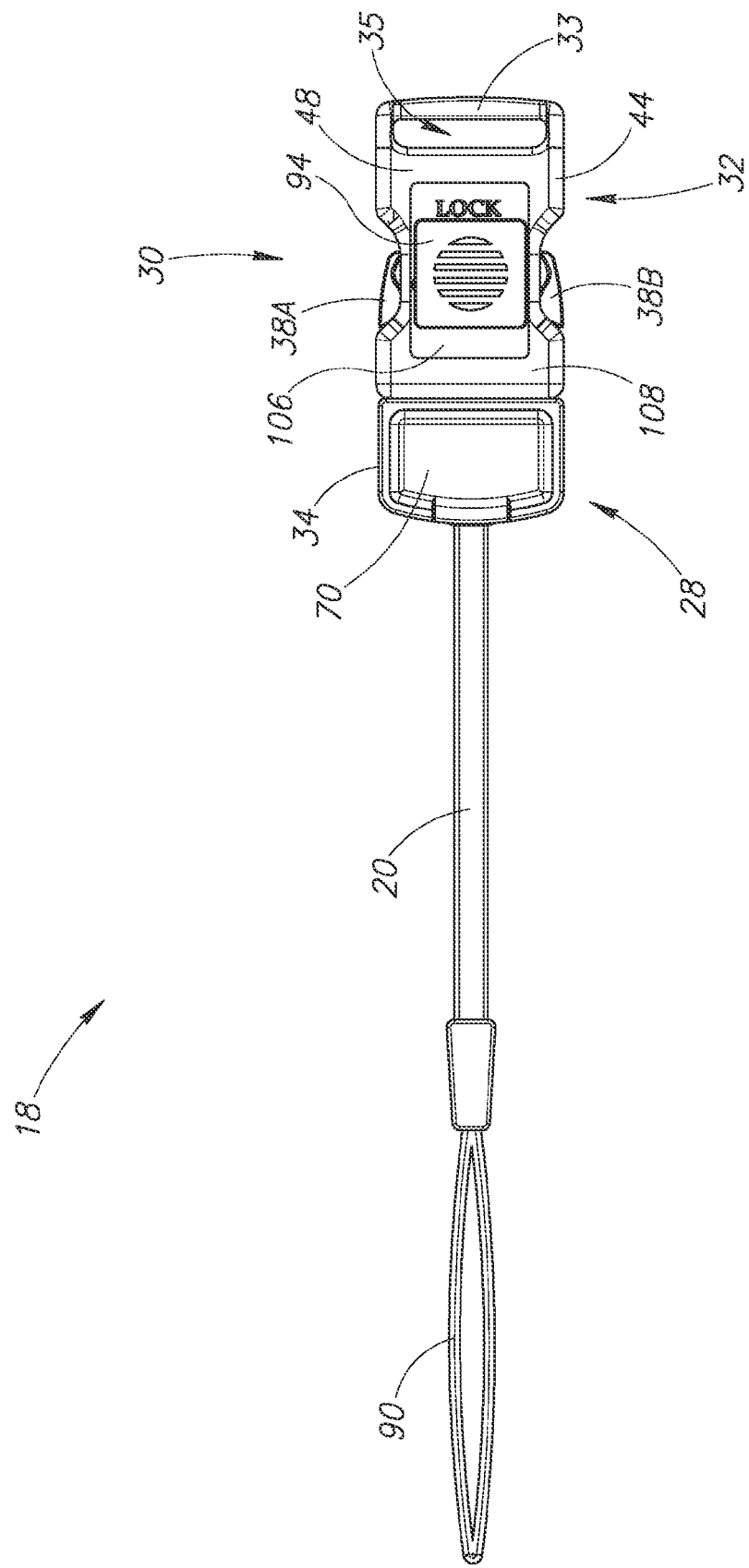
FIG. 6 illustrates a top view of the swivel tether when the plug connection component is connected to the socket connection component and a slide lock is disposed in a locked position.

The top wall 48 of the socket connection component 32 includes two "L"-shaped lock slots 104A and 104B (see FIG. 3) sized and shaped for receiving the lock tabs 96A and 96B, respectively, of the slide lock switch 92. During assembly of the buckle system 30, the slide lock switch 92 may be positioned over the socket connection component 32 (see FIG. 3) and lowered such that the lock tabs 96A and 96B pass through the lock slots 104A and 104B, respectively, and into the hollow body 44. The slide plate 94 is disposed within a recessed portion 106 of an upper surface 108 of the top wall 48. Once the lock tabs 96A and 96B are positioned within the hollow body 44 and the slide plate 94 is adjacent the upper surface 108, the slide lock switch 92 may be slidably moved between a locked position (FIG. 6) whereat the slide lock switch is disposed toward the main opening 46 and a LOCK label is viewable, and an unlocked position (FIG. 8) whereat the slide lock is disposed toward the strap receiving portion 33 and an UNLOCK label is visible.

Figure 7:
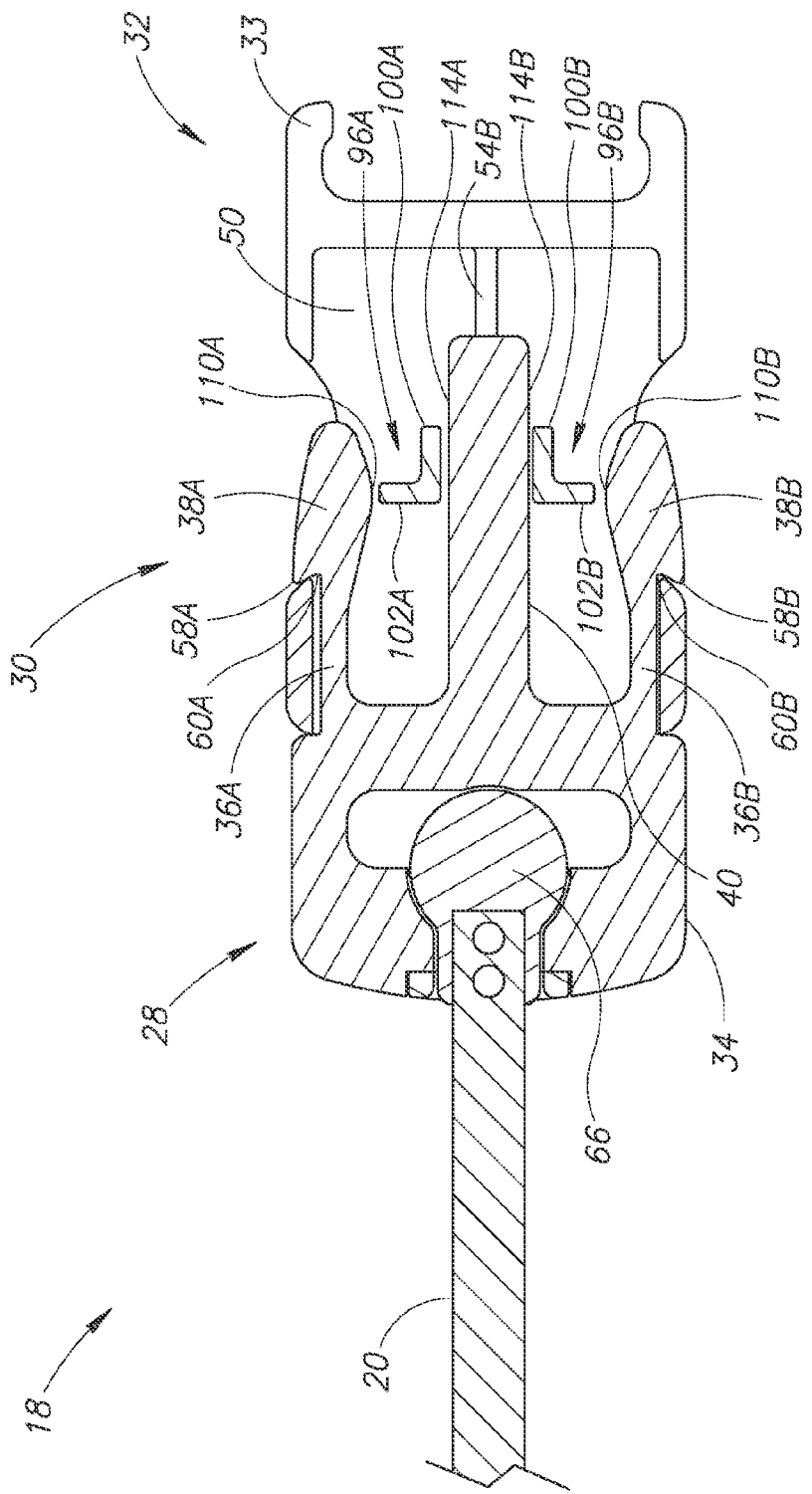
FIG. 7 illustrates a top sectional view of the swivel tether when the slide lock is disposed in the locked position.
Figure 9:
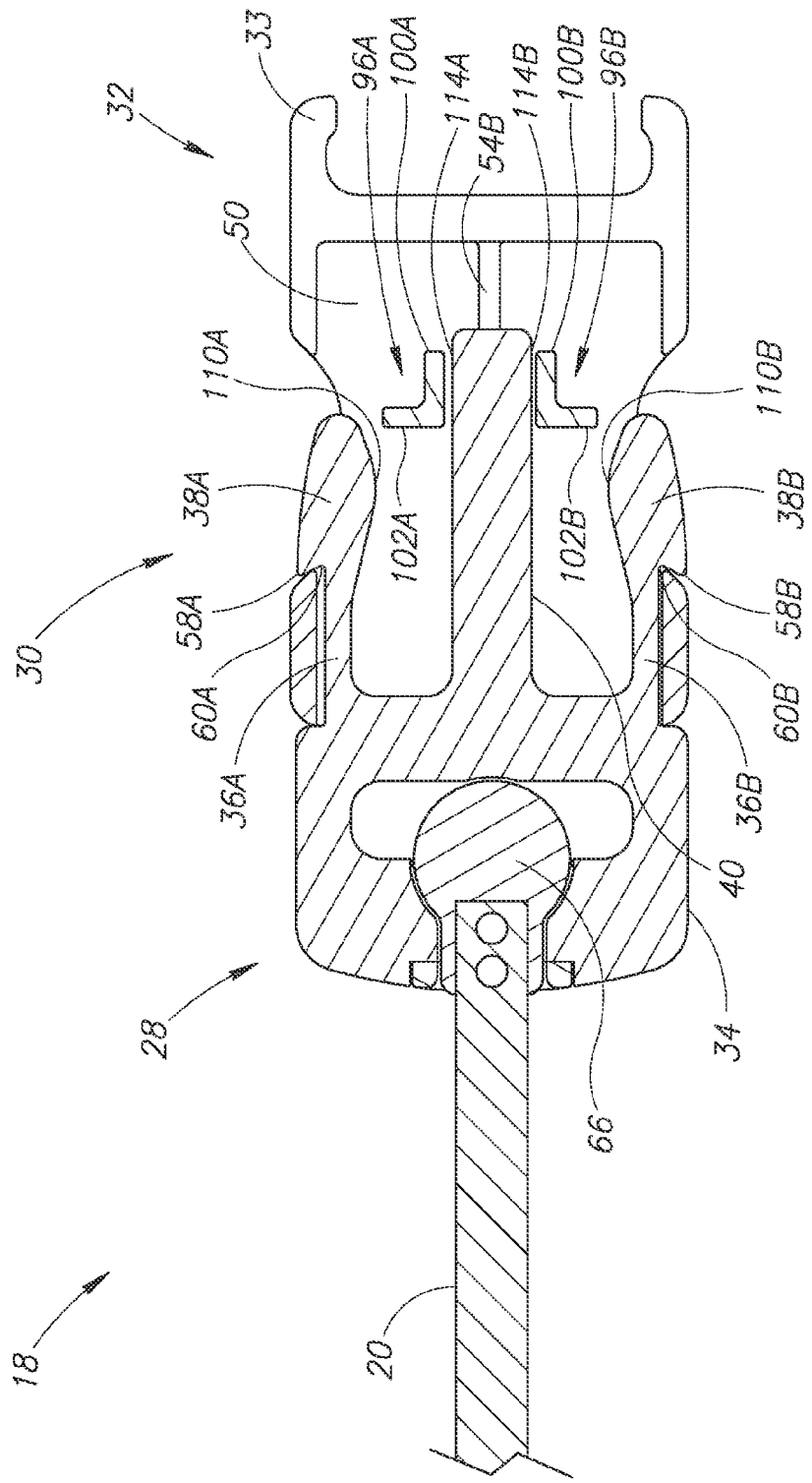
FIG. 9 illustrates a top sectional view of the swivel tether when the slide lock is disposed in the unlocked position.

The operation of the slide lock switch 92 is best shown in FIGS. 7 and 9, which illustrate top sectional views of the buckle system 30 when the slide lock switch 92 is in the locked position and the unlocked position, respectively. As shown, the guide portions 102A and 102B of the lock tabs 96A and 96B, respectively are spaced apart by an amount that is slightly larger than the width of the guide arm 40 of the plug connection component 28. The guide arm 40 may function to maintain the alignment of the lock tabs 96A and 96B of the slide lock switch 92 as the slide lock switch is moved between the locked position and the unlocked position. When in the locked position shown in FIG. 7, the lock tabs 96A and 96B are nearly in contact with inner surfaces 110A and 110B, respectively, of the locking tabs 38A and 38B of the spring arms 36A and 36B of the plug connection component 28. Thus, the lock tabs 96A and 96B of the slide lock switch 92 restrict the inward movement of the locking tabs 38A and 38B of the spring arms 36A and 36B so that the shoulders 58A and 58B cannot clear the edges 60A and 60B, respectively, of the locking slots 56A and 56B, thereby maintaining the connection between the plug connection component 28 and the socket connection component 32 and preventing their separation. Should a sufficiently large inward force be applied to the locking tabs 38A and 38B, inward movement of the guide portions 102A and 102B of the lock tabs 96A and 96B is limited by their contact with the outer walls 114A and 114B respectively, of the guide arm 40 of the plug connection component 28, which limits the inward movement of the lock tabs. This feature may prevent damage to the lock tabs 96A and 96B that could otherwise be caused by a large inward force being applied to the locking tabs 38A and 38B when the slide lock switch 92 is in the locked position.

Figure 8:
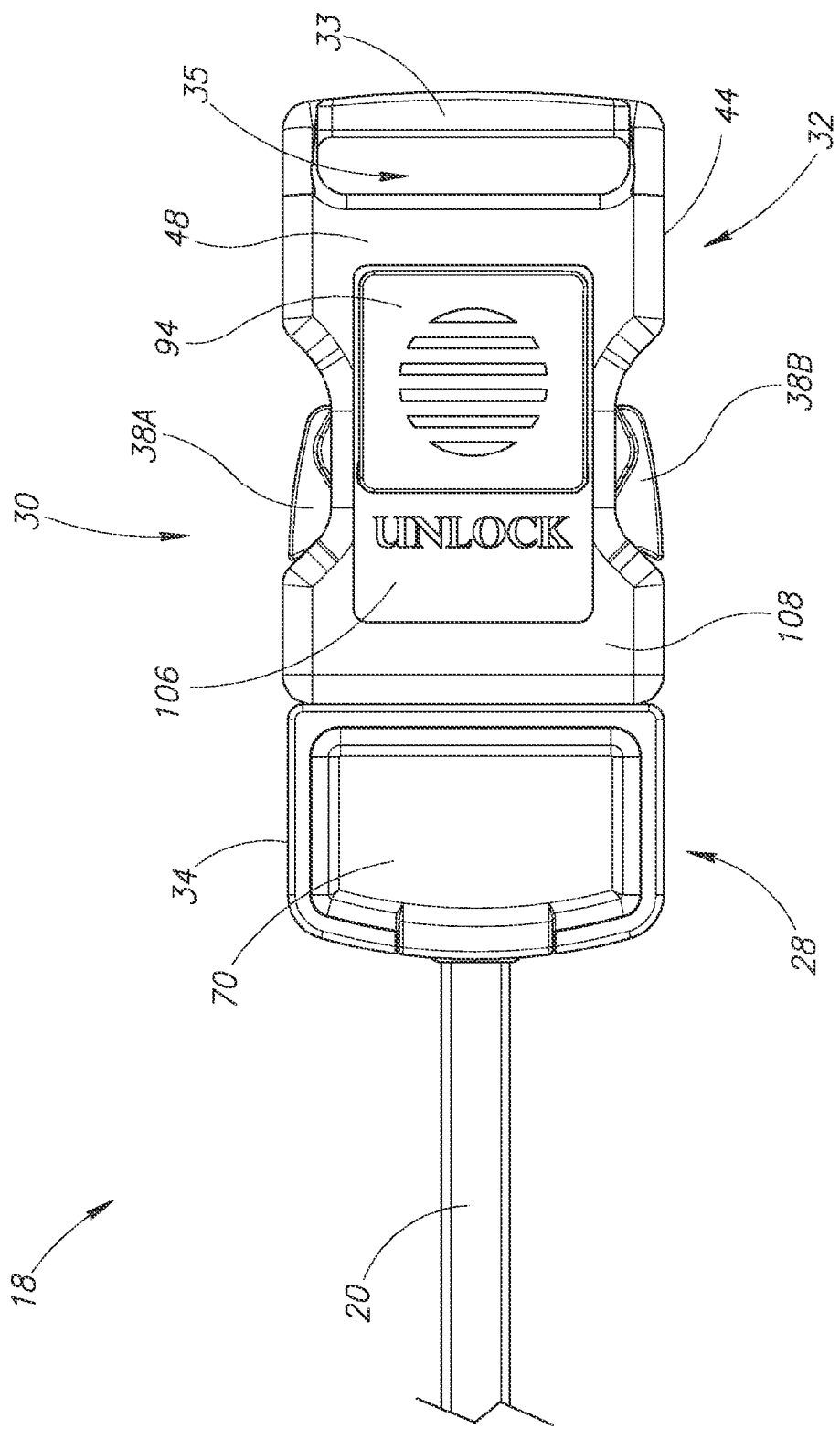
FIG. 8 illustrates a top view of the swivel tether when the plug connection component is connected to the socket connection component and the slide lock is disposed in an unlocked position.

When the slide lock switch 92 is moved into the unlocked position shown in FIGS. 8 and 9, the lock tabs 96A and 96B are moved away from the main opening 46 and out of the way of the inner surfaces 110A and 110B, respectively, of the locking tabs 38A and 38B of the spring arms 36A and 36B such that the lock tabs 96A and 96B do not substantially restrict the inward movement of the spring arms. Thus, when the slide lock switch 92 is in the unlocked position, the user may press the locking tabs 38A and 38B inward such that the shoulders 58A and 58B clear the edges 60A and 60B, respectively, of the locking slots 56A and 56B and the plug connection component 28 may be removed from the socket connection component 32.

Figure 10:
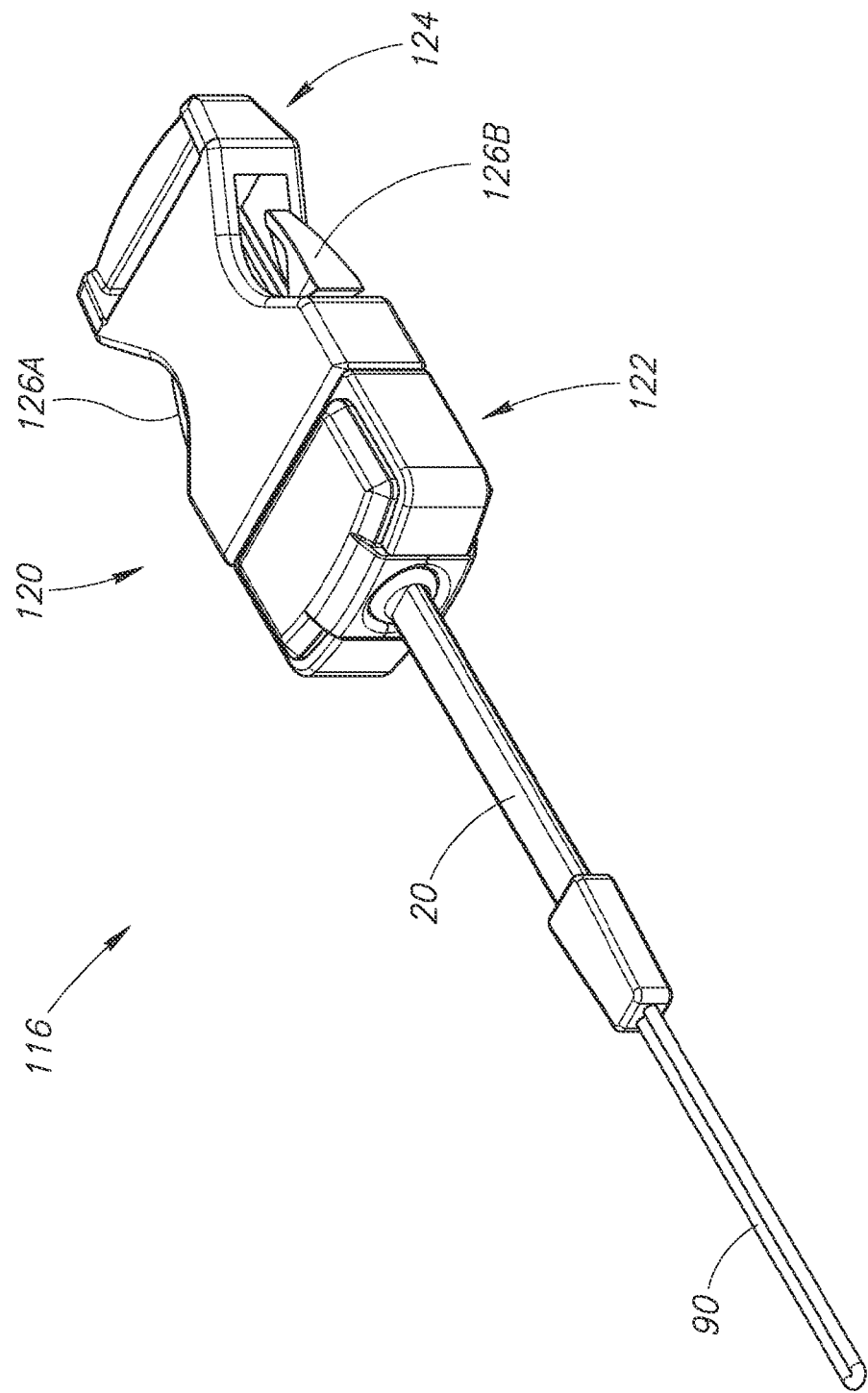
FIG. 10 illustrates a top perspective view of a second embodiment of a swivel tether that does not include a slide lock.

FIG. 10 illustrates a second embodiment of a swivel tether 116. This embodiment is substantially similar to the embodiment shown in FIGS. 1-9 and discussed above. In this embodiment a buckle system 120 is provided that does not include a slide lock switch. Thus, a plug connection component 122 of the buckle system 120 may be removed from a socket component 124 simply by pressing locking tabs 126A and 126B inward, as discussed above with reference to the buckle system 30 shown in FIGS. 1-9.

The components discussed herein may be formed from any suitable materials. For example, as discussed above, the camera attachment strap 20 may be formed out of nylon webbing. In some embodiments, at least the ball member 66 and one or more bearing surfaces 80, 84A, and 84B may be formed out of polyoxymethylene (e.g., DELRIN®).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

What is claimed is:

1. A swivel tether for selectively connecting a camera to a strap, comprising:
   a plug connection component having a base member, two flexible arms extending outwardly from the base member that each have a locking tab disposed on an end portion thereof, and a guide arm extending outwardly from the base member between the two flexible arms;
   a socket connection component comprising a hollow body with two sidewalls, a main opening for removably receiving the two flexible arms and the guide arm, and a guide rail extending lengthwise within the hollow body, the guide rail being positioned for cooperative sliding engagement with the guide arm during insertion of the two flexible arms and the guide arm into the hollow body, the hollow body further comprising a locking slot extending through each sidewall for providing access to the locking tabs and having a locking tab seat, each flexible arm biasing the corresponding locking tab to move the locking tab into the corresponding locking slot upon full insertion of the flexible arms into the main opening and into engagement with the locking tab seat of the corresponding locking slot to retain the plug connection component in the socket connection component, and the plug connection component being disconnectable from the socket connection component by pressing the locking tabs inwardly of the respective locking slots a sufficient distance such that the locking tabs are moved inwardly beyond the respective locking tab seat allowing full retraction of the flexible arms from the main opening;

a camera attachment strap comprising a first end portion and a second end portion opposite the first end portion, the first end portion being selectively couplable to a camera, one of the plug connection component and the socket connection component being a rotatable connection component, and one of the rotatable connection component and the second end portion of the camera attachment strap having a swivel connection member, and the other of the rotatable connection component and the second end portion of the camera attachment strap having a socket compartment rotatably retaining and enclosing the swivel connection member therein to rotatably couple the camera attachment strap to the rotatable connection component such that the rotatable connection component may rotate freely relative to the camera attachment strap, the socket compartment being an enclosed compartment separated from the rotatable connection component; and a lock at least partially disposed within the hollow body of the socket connection component and movable between a locked position whereat the lock restricts inward movement of the locking tabs to prevent the locking tabs from becoming unseated from the respective locking tab seats of the locking slots, and an unlocked position whereat the lock allows inward movement of the locking tabs such that the locking tabs may become unseated from the respective locking tab seats of the locking slots to allow disconnection of the plug connection component from the socket connection component.

2. The swivel tether of claim 1, wherein the lock comprises a slide plate positionable on an outer surface of the socket connection component and slidable lengthwise with respect thereto, and a lock portion extending from the slide plate through an aperture in the socket connection component into the hollow body, the lock portion of the lock being configured to restrict inward movement of the locking tabs to prevent the locking tabs from becoming unseated from the respective locking tab seats of the locking slots when the lock is in the locked position.

3. The swivel tether of claim 1, wherein the socket compartment comprises a plurality of bearing surfaces that together define a bearing shell for the swivel connection member.

4. The swivel tether of claim 1, the socket connection component including two lock attachment slots, the lock being a sliding lock having an outer portion on an outer surface side of the socket connection component, and the sliding lock having two lock attachment members each extending from the outer portion into one of the two lock attachment slots to slideably engage the sliding lock with the socket connection component, wherein the sliding lock slides to move between the locked position and the unlocked position.

5. The swivel tether of claim 1, wherein the lock is a monolithically formed element.

6. A swivel tether for selectively connecting a camera to a strap, comprising:

a plug connection component having a plug end portion, the plug connection component comprising a base member, and the plug end portion comprising at least one flexible arm extending outwardly from the base member, the flexible arm having a locking tab disposed on an end portion thereof; the plug connection component further comprising a guide arm extending outwardly from the base member adjacent to the flexible arm;

a socket connection component having a socket end portion for releasably connecting with the plug end portion, one of the plug connection component and the socket connection component having a camera attachment strap engagement end portion comprising a swivel socket, and the other of the plug connection component and the socket connection component having a strap receiving end portion configured to slidably engage a strap, the socket connection component comprises a hollow body with at least one sidewall, a connection opening for removably receiving the flexible arm, a locking opening extending through the sidewall for providing access to the locking tab and having a locking tab seat, wherein the flexible arm biases the locking tab to move the locking tab into the locking opening upon full insertion of the flexible arm into the connection opening and into engagement with the locking tab seat of the locking openings to retain the plug connection component in the socket connection component, and wherein the plug connection component is disconnectable from the socket connection component by pressing the locking tab inwardly of the locking opening a sufficient distance such that the locking tab is moved inwardly beyond the locking tab seat of the locking opening allowing full retraction of the flexible arm from the connection opening, the hollow body of the socket connection component comprising a guide rail extending lengthwise therein, the guide rail being positioned for cooperative sliding engagement with the guide arm during insertion of the flexible arm and the guide arm into the hollow body through the connection opening;

a lock at least partially disposed within the hollow body of the socket connection component and movable between a locked position whereat the lock restricts inward movement of the locking tab to prevent the locking tab from becoming unseated from the locking tab seat, and an unlocked position whereat the lock allows inward movement of the locking tab such that the locking tab may become unseated from the locking seat to allow disconnection of the plug connection component from the socket connection component; and a camera attachment strap comprising a first end portion and a second end portion opposite the first end portion, a camera connection component disposed at the first end portion that is selectively couplable to a camera, and a swivel connection member disposed at the second end portion that is retained and enclosed within an enclosed compartment of the swivel socket to secure the camera attachment strap to one of the plug connection component and the socket connection component such that the camera attachment strap may rotate freely relative thereto, wherein the enclosed compartment is a compartment separated from the one of the plug connection component and the socket connection component.

7. The swivel tether of claim 6, wherein the lock comprises a slide plate positionable on an outer surface of the socket connection component and slidable with respect thereto, and a lock tab extending from the slide plate through an aperture in the socket connection component into the hollow body.

8. The swivel tether of claim 6, wherein the strap receiving end portion comprises an elongated aperture.

9. The swivel tether of claim 6, wherein the swivel connection member has a portion thereof having a partial spherical contour, and the swivel socket comprises a bearing shell formed from a plurality of bearing surfaces shaped to match the curvature of the portion of the swivel connection member having the partial spherical contour.

10. The swivel tether of claim 6, the lock being operative to prevent the disconnection of the plug end portion of the plug connection component from the socket end portion of the socket connection component.

11. The swivel tether of claim 6, the socket connection component including two lock attachment slots, the lock being a sliding lock having an outer portion on an outer surface side of the socket connection component, and the sliding lock having two lock attachment members each extending from the outer portion into one of the two lock attachment slots to slideably engage the sliding lock with the socket connection component, wherein the sliding lock slides to move between the locked position and the unlocked position.

12. The swivel tether of claim 6, wherein the lock is a monolithically formed element.

* * * * *